(12) United States Patent
Velagapalli et al.

(10) Patent No.: US 11,711,213 B2
(45) Date of Patent: Jul. 25, 2023

(54) MASTER KEY ESCROW PROCESS

(71) Applicant: Polysign, Inc., Oakland, CA (US)

(72) Inventors: Arun Velagapalli, San Francisco, CA (US); Nitin Mahendru, San Jose, CA (US); Arthur Britto, San Francisco, CA (US); David Schwartz, Tiburon, CA (US); Kimon Papahadjopoulos, Milpitas, CA (US)

(73) Assignee: POLYSIGN, INC., Oakland, CA (US)

( * ) Notice: Subject to any disclaimer, the term of this patent is extended or adjusted under 35 U.S.C. 154(b) by 125 days.

(21) Appl. No.: 17/219,473

(22) Filed: Mar. 31, 2021

(65) Prior Publication Data
US 2022/0029801 A1 Jan. 27, 2022

Related U.S. Application Data

(60) Provisional application No. 63/055,760, filed on Jul. 23, 2020.

(51) Int. Cl.
H04L 9/08 (2006.01)
H04L 9/40 (2022.01)
H04L 9/32 (2006.01)

(52) U.S. Cl.
CPC .......... H04L 9/0894 (2013.01); H04L 9/0877 (2013.01); H04L 9/3247 (2013.01); H04L 9/3268 (2013.01); H04L 63/0823 (2013.01)

(58) Field of Classification Search
None
See application file for complete search history.

(56) References Cited

U.S. PATENT DOCUMENTS

| 8,892,868 | B1 | 11/2014 | Jenks | |
| 2005/0138374 | A1* | 6/2005 | Zheng | H04L 9/0894 713/166 |
| 2015/0006907 | A1 | 1/2015 | Brouwer | |
| 2016/0127903 | A1 | 5/2016 | Lee | |
| 2020/0177563 | A1* | 6/2020 | Huapaya | H04L 63/0435 |

OTHER PUBLICATIONS

International Search Report and Written Opinion for App. No. PCT/US2021/042910, dated Nov. 5, 2021, 11 pages.

* cited by examiner

Primary Examiner — Brandon Hoffman
(74) Attorney, Agent, or Firm — Butzel Long

(57) ABSTRACT

Methods, computer readable media, and devices for escrow of master keys and recovery of previously escrowed master keys may be disclosed. A method for escrow of master keys may include registering a root certificate authority (CA) within each of two first-party hardware security modules (HSMs), initializing each of three third-party HSMs as master escrow recovery devices, performing a bootstrap operation on an authoritative blockchain to generate three master keys, generating a first set of master key shard ciphertexts using a first one of the three master escrow recovery devices, a second set using a second one of the three master escrow recovery devices, and a third set using a third one of the three master escrow recovery devices, and storing the first, the second, and the third set of master key shard ciphertexts as opaque objects in each of the two first-party HSMs.

15 Claims, 7 Drawing Sheets

MASTER KEY ESCROW PROCESS

PRIORITY

This application claims priority to U.S. Provisional Patent Application 63/055,760, filed Jul. 23, 2020 and entitled "MASTER KEY ESCROW PROCESS", the entirety of which is incorporated herein by reference.

BACKGROUND

Blockchains are an increasingly popular means of storing various types of data, including transactional data such as movement of a resource from on entity to another. For example, blockchains are often used to store transactions associated with one or more cryptocurrencies, where each entity involved in the transaction has a cryptocurrency address or similar construct that stores amounts of a cryptocurrency owned by the entity. Such an address typically operates through use of one or more secrets that provide control of the address. For example, the cryptocurrency address may have a public portion that allows any entity to send value to the wallet, and one or more cryptographically-secure keys that allow only the key owner to make changes to operation of the address, send value out of the address to another address, and the like.

BRIEF SUMMARY

According to an embodiment of the disclosed subject matter, a computer-implemented method for escrow of master keys may include registering a root certificate authority (CA) within each of two first-party hardware security modules (HSMs), the two first-party HSMs corresponding to a single first party, initializing each of three third-party HSMs as master escrow recovery devices, performing a bootstrap operation on an authoritative blockchain to generate three master keys, generating a first set of master key shard ciphertexts using a first one of the three master escrow recovery devices, a second set of master key shard ciphertexts using a second one of the three master escrow recovery devices, and a third set of master key shard ciphertexts using a third one of the three master escrow recovery devices, and storing the first set of master key shard ciphertexts, the second set of master key shard ciphertexts, and the third set of master key shard ciphertexts as opaque objects in each of the two first-party HSMs.

In various embodiments, each third-party HSM may correspond to a different third party, the different third parties may be different from the single first party, and the different third parties and the single first party all may peer review the master escrow recovery device initialization.

In some embodiments, initializing each of the three third-party HSMs as master escrow recovery devices may include loading a certificate into each of the third-party HSM, the certificate comprising a public key signed by an intermediate CA corresponding to the root CA, registering the certificate into each of the two first-party HSMs, and for each of the three third-party HSMs: registering a serial number of the corresponding third-party HSM into each of the two first-party HSMs; generating a public private key pair of the corresponding third-party HSM, an attestation certificate of the public private key pair being verified by the first party without export capability; exporting the public key portion from the corresponding third-party HSM; and registering the exported public key portion into each of the two first-party HSMs.

In some embodiments, generating a first set of master key shard ciphertexts using the first master escrow recovery device, a second set of master key shard ciphertexts using the second master escrow recovery device, and a third set of master key shard ciphertexts using the third master escrow recovery devices may include generating, for each of the three master keys, a first master key shard, a second master key shard, and a third master key shard, encrypting each of the first master key shards using a first public key exported from the first master escrow recovery device to generate the first set of master key shard ciphertexts, encrypting each of the second master key shards using a second public key exported from the second master escrow recovery device to generate the second set of master key shard ciphertexts, and encrypting each of the third master key shards using a third public key exported from the third master escrow recovery device to generate the third set of master key shard ciphertexts. In these embodiments, the first, second, and third public keys may be registered in each of the two first-party HSMs.

In various embodiments, the method may further include initializing each of three additional third-party HSMs as redundant master escrow recovery devices, each redundant master escrow recovery device corresponding to one master escrow recovery device.

In various embodiments, the method may further include initializing at least one additional third-party HSMs as an additional master escrow recovery device, each additional third-party HSM corresponding to a different third party, generating at least one additional set of master key shard ciphertexts using the at least one additional master escrow recovery device, storing the at least one additional set of master key shard ciphertexts in the at least two different write once read many (WORM) storage, and storing the at least one additional set of master key shard ciphertexts as opaque objects in each of the two first-party HSMs.

In some embodiments, the different third parties and the single first party may all peer review the master escrow recovery device initialization.

In various implementations, the method may include storing the first set of master key shard ciphertexts, the second set of master key shard ciphertexts, and the third set of master key shard ciphertexts in at least two different write once read many (WORM) storage devices.

According to an embodiment of the disclosed subject matter, a computer-implemented method for recovery of master keys from escrow may include retrieving a first set of master key shard ciphertexts from a prior escrow generated using a first master escrow recovery device associated with a first of three different third parties, wherein the first set of master key shard ciphertexts comprises a first master key shard ciphertext of a first master key of an authoritative blockchain of a first party, a first master key shard of a second master key of the authoritative blockchain, and a first master key shard of a third master key of the authoritative blockchain, retrieving a second set of master key shard ciphertexts from the prior escrow generated using a second master escrow recovery device associated with a second of the three different third parties, wherein the second set of master key shard ciphertexts comprises a second master key shard ciphertext of the first master key, a second master key shard of the second master key, and a second master key shard of the third master key, retrieving a third set of master key shard ciphertexts from the prior escrow generated using a third master escrow revery device associated with a third of the three different third parties, wherein the third set of master key shard ciphertexts comprises a third master key shard ciphertext of the first master key, a third master key shard of the second master key, and a third master key shard of the third master key, obtaining a set of master escrow recovery devices, wherein each master escrow recovery device comprises a third-party hardware security module (HSM), each third-party HSM was previously initialized as a master escrow recovery device by registering information corresponding to each third-party HSM in a first-party HSM of the first party, and the set of master escrow recovery devices includes at least two of the first, the second, and the third master escrow recovery devices, decrypting, using the set of master escrow recovery devices, at least two master key shard ciphertexts of each set of master key shard ciphertexts to produce three sets of recovered master key shards, generating, for each of three groups of first-party HSMs, a public private key pair, loading a first set of recovered master key shards on the first group of first-party HSMs, a second set of recovered master key shards on the second group of first-party HSMs, and a third set of recovered master key shards on the third group of first-party HSMs, decrypting, using a corresponding private key of the corresponding group of first-party HSMs, each recovered master key shard of the three sets of recovered master key shards, and recovering, using the three sets of recovered master key shards, three master keys of the authoritative blockchain of the first party.

In some implementations, the first party is different from each of the three different third parties.

In various implementations, the first set of master key shard ciphertexts was previously generated by encrypting the first master key shard of the first master key using a first public key exported from the first master escrow recovery device, encrypting the first master key shard of the second master key using a second public key exported from the second master escrow recovery device, and encrypting the first master key shard of the third master key using a third public key exported from the third master escrow recovery device, the second set of master key shard ciphertexts was previously generated by encrypting the second master key shard of the first master key using the first public key exported from the first master escrow recovery device, encrypting the second master key shard of the second master key using the second public key exported from the second master escrow recovery device, and encrypting the second master key shard of the third master key using the third public key exported from the third master escrow recovery device, and the third set of master key shard ciphertexts was previously generated by encrypting the third master key shard of the first master key using the first public key exported from the first master escrow recovery device, encrypting the third master key shard of the second master key using the second public key exported from the second master escrow recovery device, and encrypting a third master key shard of the third master key using the third public key exported from the third master escrow recovery devices.

In some implementations, the first set of recovered master key shards corresponds to the first master key, the second set of recovered master key shards corresponds to the second master key, and the third set of recovered master key shards corresponds to the third master key.

In some implementations, each group of first-party HSMs may include two first-party HSMs and the first-party HSMs may correspond to the first party.

In various implementations, loading a first set of recovered master key shards on the first group of first-party HSMs, a second set of recovered master key shards on the second group of first-party HSMs, and a third set of recovered master key shards on the third group of first-party HSMs may include, for the first set of recovered master key shards: encrypting, using the first group of first-party HSMs, each recovered master key shard of the first set of recovered master key shards using a public key of the public private key pair of the first group of first-party HSMs; and storing the encrypted recovered master key shards of the first set of recovered master kay shards on the first group of first-party HSMs, for the second set of recovered master key shards: encrypting, using the second group of first-party HSMs, each recovered master key shard of the second set of recovered master key shards using a public key of the public private key pair of the second group of first-party HSMs; and storing the encrypted recovered master key shards of the second set of master kay shards on the second group of first-party HSMs, and for the third set of recovered master key shards: encrypting, using the third group of first-party HSMs, each recovered master key shard of the third set of recovered master key shards using a public key of the public private key pair of the third group of first-party HSMs; and storing the encrypted recovered master key shards of the third set of master key shards on the third group of first-party HSMs.

In various implementations, the method may further include retrieving at least one additional set of master key shard ciphertexts, each additional set of master key shard ciphertexts comprising an additional master key shard ciphertext of the first master key, an additional master key shard of the second master key, and an additional master key shard of the third master key and each additional set of master key shard ciphertexts previously escrowed using an additional master escrow recovery device, wherein the set of master escrow recovery devices includes at least three of the first, the second, the third, and the at least one additional master escrow recovery devices.

In some implementations, decrypting at least two master key shard ciphertexts of each set of master key shard ciphertexts to produce three sets of master key shards may include using a physically isolated computing device.

According to an embodiment of the disclosed subject matter, a computer-implemented method may include escrowing three master keys of an authoritative blockchain of a first party with three different third parties, wherein the escrowing is peer reviewed by the first party and the three different third parties and recovering the three master keys from escrow, wherein the recovering involves the first party and at least two of the three different third parties and the recovering is peer reviewed by the first party and the at least two of the three different third parties.

In various implementations, escrowing three master keys of an authoritative blockchain of a first party with three different third parties may include registering a root certificate authority (CA) within each of two first-party hardware security modules (HSMs), the two first-party HSMs corresponding to the first party, initializing each of three third-party HSMs as master escrow recovery devices, wherein: each third-party HSM corresponds to a different one of the three different third parties; the different third parties are different from the single first party; and the different third parties and the single first party all peer review the master escrow recovery device initialization, performing a bootstrap operation on the authoritative blockchain to generate the three master keys, generating a first set of master key shard ciphertexts using a first one of the three master escrow recovery devices, a second set of master key shard ciphertexts using a second one of the three master escrow recovery devices, and a third set of master key shard ciphertexts using a third one of the three master escrow recovery devices, and storing the first set of master key shard ciphertexts, the second set of master key shard ciphertexts, and the third set of master key shard ciphertexts as opaque objects in each of the two first-party HSMs.

In various implementations, recovering the three master keys from escrow may include retrieving three sets of master key shard ciphertexts corresponding to the three master keys of the authoritative blockchain of the first party, wherein: the first set of master key shard ciphertexts comprises a first master key shard ciphertext of the first master key, a first master key shard of the second master key, and a first master key shard of the third master key, the first set of master key shard ciphertexts previously escrowed using a first master escrow recovery device; the second set of master key shard ciphertexts comprises a second master key shard ciphertext of the first master key, a second master key shard of the second master key, and a second master key shard of the third master key, the second set of master key shard ciphertexts previously escrowed using a second master escrow recovery device; the third set of master key shard ciphertexts comprises a third master key shard ciphertext of the first master key, a third master key shard of the second master key, and a third master key shard of the third master key, the third set of master key shard ciphertexts previously escrowed using a third master escrow recovery device; each master escrow recovery device corresponds to a different one of the three third parties; and the first party is different from each of the three third parties, obtaining a set of master escrow recovery devices, wherein: each master escrow recovery device comprises a third-party hardware security module (HSM); each third-party HSM was previously initialized as a master escrow recovery device by registering information corresponding to each third-party HSM in a first-party HSM of the first party; and the set of master escrow recovery devices includes at least two of the first, the second, and the third master escrow recovery devices, decrypting, using the set of master escrow recovery devices, at least two master key shard ciphertexts of each set of master key shard ciphertexts to produce three sets of master key shards, generating, for each of three groups of first-party HSMs, a public private key pair, loading a first set of recovered master key shards on the first group of first-party HSMs, a second set of recovered master key shards on the second group of first-party HSMs, and a third set of recovered master key shards on the third group of first-party HSMs, decrypting, using a corresponding private key of the corresponding group of first-party HSMs, each master key shard of the three sets of recovered master key shards, and recovering, using the three sets of recovered master key shards, three master keys of the authoritative blockchain of the first party.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
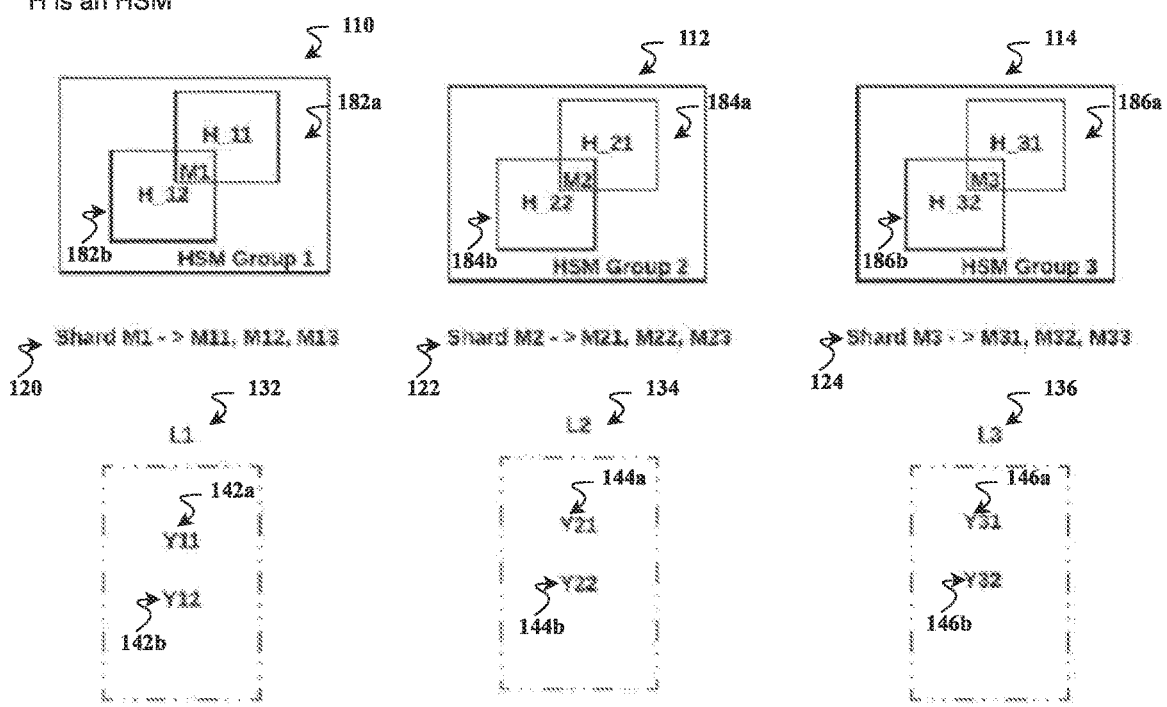
FIG. 1 shows a block diagram of elements used as part of escrow of master keys according to embodiments of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Embodiments disclosed herein use a blockchain embodied in an ordered list of linked blocks. In contrast to purely transactional blockchains such as those used to track Bitcoin and other similar cryptocurrency transactions, a blockchain as disclosed herein may store both transactions and policies in the ordered list, where the policies control actions that are possible on or with respect to the blockchain. Modification of the policies themselves also may be controlled through the transactions and policies in the ordered list. Such a blockchain may be referred to herein as an "authoritative blockchain." As disclosed herein, an authoritative blockchain may provide advantages over conventional transactional blockchains as well as permissionless and public blockchains that rely on policies and restrictions that are external to the blockchain itself to ensure validity and trustworthiness of transactions or other data stored on the blockchain.

In an authoritative blockchain as disclosed herein, the policies stored on the blockchain may determine which actions are taken when a particular transaction or type of transaction is stored on the blockchain. For example, a policy may specify that a particular transaction or type of transaction requires a minimum number of approvers to approve the transaction before it takes place and is included on the blockchain. Various types of transactions may be considered for an authoritative blockchain as disclosed herein. Policies may be modified by submitting transactions to the blockchain.

Initial policies and permissions of an authoritative blockchain as disclosed herein may be defined via a special "bootstrap" transaction that is required as the first transaction accepted by the blockchain and not accepted subsequently. An example bootstrap transaction and process is described in further detail below. As part of such bootstrap transaction, a master secret or set of master secrets may be generated. For example, three master secrets may be generated as part of a bootstrap transaction of an authoritative blockchain. These master keys may be used to encrypt or otherwise protect information associated with digital assets stored on the authoritative blockchain. For example, each digital asset address of the authoritative blockchain may have a corresponding public private key pair and these master keys may be used to encrypt the private key portion or shards of the private key portion. In one example, each private key may be sharded into three shards and each of three master keys may be used to encrypt the shards (e.g., a first master key encrypts a first shard, a second master key encrypts a second shard, and a third master key encrypts a third shard). In addition, these master keys may be used to recover the authoritative blockchain in the event of a disaster. As such, there is a need for methods and systems, as disclosed herein, which allow for escrow and recovery from escrow of the master secrets or keys.

In embodiments disclosed herein, a first entity, such as Polysign, may entrust a number of second entities, such as law firms or other fiduciaries or secured/trusted third parties, to escrow master keys. For example, three law firms may be selected to escrow three master keys. Instead of using plaintext master keys or storing a master key in a universal serial bus (USB) storage device, a secure mini hardware security module (HSM) may be used. A HSM may allow for installation and execution of code within the HSM. Such HSMs typically provide tamper-proof computing and/or computer readable storage that can be secured through a combination of software and hardware elements. Examples of suitable HSM hardware may include those from Yubico of Palo Alto, Calif., nCipher Security of Cambridge, and Utimaco of Aachen, Germany, though any HSM device known in the art may be used that is capable of performing the functions disclosed herein. Unless specified otherwise, an "HSM" used in conjunction with an authoritative blockchain system as disclosed herein refers to an HSM that can receive and execute cryptographically-signed code within the secure boundaries of the HSM. Such a device typically provides encryption guarantees that may be required by the first party, with minimal operational overhead for the third parties.

More generally, a master key escrow process may involve performing a bootstrap operation for an authoritative blockchain of a first party to generate three master keys, creating a number of shards of each master key, initializing a number of third-party HSMs as master escrow recovery devices, encrypting the various shards using public keys exported from the master escrow recovery devices to generate a ciphertext of each shard, and storing the various ciphertexts on two first-party HSMs.

In turn, a master key escrow recovery process may involve retrieving the various ciphertexts from the two first-party HSMs, obtaining at least a majority of the master escrow recovery devices, decrypting a sufficient number of the various ciphertexts using the master escrow recovery devices to recover corresponding master key shards, loading the recovered master key shards onto three groups of HSMs, and recovering the three master keys using the recovered master key shards.

An example master key escrow procedure as disclosed herein is provide below. It will be understood that some variations may be used without departing from the scope and content of the invention disclosed herein. For example, different numbers of trusted/secured second entities may be used, equivalent but different security modules may be used, and the like.

In various embodiments, a first party may purchase or otherwise acquire a number of third-party HSMs corresponding to the third parties providing escrow services. For example, if there are three third parties, the first party may purchase a total of six HSMs such that each third party has two corresponding HSMs (i.e., the first third party has two HSMs, the second third party has two HSMs, and the third third party has two HSMs). The various third-party HSMs may be generally referred to herein as master escrow recovery devices or redundant master escrow recovery devices. In addition, the first party may also purchase or otherwise acquire a number of first-party HSMs in order to store various ciphertexts, referred to herein as ciphertext HSMs, as well as a number of first-party HSMs to store various information associated with the third-party HSMs (i.e., a group of first-party HSMs corresponding to each third party). Continuing the example, the first party may purchase two HSMs on which to store various ciphertexts and six HSMs (three groups of two) on which to store information associated with the third-party HSMs. In this example, a first set of third-party HSMs and a first group of first-party HSMs are associated with a first third party, a second set of third-party HSMs and a second group of first-party HSMs are associated with a second third party, and a third set of third-party HSMs and a third group of first-party HSMs are associated with a third third party.

In various embodiments, the first party may register a root certificate authority (CA) into the various groups of first-party HSMs. In addition, a certificate in which the public key is signed by an intermediate CA of the root CA may be registered in various sets of third-party HSMs. In this way, a root of trust may be traced for each of the third-party HSMs.

In various embodiments, the first party may register a serial number of each of the third-party HSMs in a set in the corresponding group of first-party HSMs. For example, the serial numbers of the third-party HSMs in the first set may be registered in the first group of first-party HSMs, the serial numbers of the third-party HSMs in the second set may be registered in the second group of first-party HSMs, and the serial numbers of the third-party HSMs of the third set may be registered in a third group of first-party HSMs. The first party may also register a public key of each of the third-party HSMs in the corresponding groups of first-party HSMs.

In various embodiments, the certificate registrations, the serial number registrations, and the public key registrations may all be peer reviewed by the first party and each of the third parties.

In various embodiments, a public private key pair of each of the third-party HSMs may be generated with decrypt capabilities. Each public private key pair may have an attestation certificate and each attestation certificate may be verified by the first party without export capability in order to prevent export of the generated private key. Each of the public keys of the third-party HSMs may be exported from the third-party HSMs.

In various embodiments, a bootstrap operation may be performed on an authoritative blockchain to generate a number of master keys. For example, a bootstrap operation may generate three master keys. Each master key may be sharded into a number of shards. For example, each master key may be sharded into three shards. The various master key shards may be organized into sets of master key shards. For example, the first shard of each master key may be grouped into a first set, the second shard of each master key may be grouped into a second set, and a third shard of each master key may be grouped into a third set. Each set of master key shards may be associated with a different one of the third parties. Each set of master key shards may be encrypted using a public key of the set of third-party HSMs associated with a corresponding third party (e.g., first set encrypted using third-party HSMs associated with a first third party, second set encrypted using third-party HSMs associated with a second third party, etc.).

In the example of three third parties and three master keys, there may be a first group of first-party HSMs, a first set of third-party HSMs (e.g., a first master escrow recovery device and a first redundant master escrow recovery device), and a first set of master key shards (e.g., a first shard of a first master key, a first shard of a second master key, and a first shard of a third master key) associated with a first third party; a second group of first-party HSMs, a second set of third-party HSMs (e.g., a second master escrow recovery device and a second redundant master escrow recovery device), and a second set of master key shards (e.g., a second shard of the first master key, a second shard of the second master key, and a second shard of the third master key) associated with a second third party; and a third group of first-party HSMs, a third set of third-party HSMs (e.g., a third master escrow recovery device and a third redundant master escrow recovery device), and a third set of master key shards (e.g., a third shard of the first master key, a third shard of the second master key, and a third shard of the third master key) associated with a third third party. In this example, a first public key of the first set of third-party HSMs may be used to encrypt each master key shard of the first set of master key shards, a second public key of the second set of third-party HSMs may be used to encrypt each master key shard of the second set of master key shards, and a third public key of the third set of third-party HSMs may be used to encrypt each master key shard of the third set of master key shards. The various encryption steps may result in various sets of master key shard ciphertexts (i.e., a first set of master key shard ciphertexts corresponding to the first set of master key shards, a second set of master key shard ciphertexts corresponding to the second set of master key shards, and a third set of master key shard ciphertexts corresponding to the third set of master key shards).

In various embodiments, the various master key shard ciphertexts may be stored on two first-party HSMs different from the groups of first-party HSMs. The various master key shard ciphertexts may also be stored on two write once read many (WORM) storage devices of the first party. Of note, while the encryption keys used to generate the ciphertexts are stored on the third-party HSMs (i.e., the various master escrow recovery devices), the ciphertexts are stored on devices (e.g., HSMs, WORMs, or the like) of the first party.

An example master key escrow recovery procedure as disclosed herein is provide below. It will be understood that some variations may be used without departing from the scope and content of the invention disclosed herein. For example, different numbers of trusted/secured second entities may be used, equivalent but different security modules may be used, and the like.

In various embodiments, a first party may contact some number of third parties who are providing escrow services on behalf of the first party. In one example, each third party may be a law firm or other fiduciary or secured/trusted third party. In some embodiments, the number of third parties contacted may be less than a total number of third parties providing escrow services. For example, while a total of three third parties may be providing escrow services, only two of the three third parties may be contacted. In various embodiments, the contacted third parties may verify an identity of the first party. For example, the contact may occur via a video call or in person. As part of the contact, the first party may request that each third party provide the third-party HSM(s) corresponding to the third party. For example, each third party may be requested to provide the master escrow recovery device (and/or the redundant master escrow recovery device) being held by that third party.

In various embodiments, the first party may purchase or otherwise acquire a physically isolated computing device with which to perform various steps of the recovery process. For example, the first party may buy a laptop that may subsequently be destroyed. In some embodiments, representatives from the first party as well as each of the third parties may participate and/or otherwise observe various steps of the recovery process. For example, a security officer and/or member(s) of a management team of the first party as well as one or more representatives of each third party may be involved.

In various embodiments, previously generated master key shard ciphertexts may be obtained from one or more storage devices. For example, the master key shard ciphertexts generated as part of the escrow process described above may be retrieved from the two first-party HSMs or WORMs of the first party, as described above.

Of note, a third-party HSM (i.e., a master escrow recovery device) of a first third party may correspond to a first set of master key shard ciphertexts (i.e., the set containing encrypted first shards of each master key), a third-party HSM of a second third party may correspond to a second set of master key shard ciphertexts, and a third-party HSM of a third third party may correspond to a third set of master key shard ciphertexts. Such correspondence may be that the public key used to generate the set of ciphertexts is associated with a private key stored on the third-party HSM. That is, a private key of the third-party HSM may be utilized to decrypt the master key shard ciphertexts of the corresponding set.

In various embodiments, a first master escrow recovery device (e.g., third-party HSM of a first third party) may be used to decrypt the first set of master key shard ciphertexts, a second master escrow recovery device (e.g., third-party HSM of a second third party) may be used to decrypt the second set of master key shard ciphertexts, and a third master escrow recovery device (e.g., third-party HSM of a third third party) may be used to decrypt the third set of master key shard ciphertexts. Such decryption may occur using the physically isolated computing device. For example, the first master escrow recovery device may be connected to the computing device and the first set of master key shard ciphertexts may be provided to the computing device. An operator of the computing device may transfer the first set of ciphertexts to the first master escrow recovery device (e.g., first third-party HSM) and issue a command for the HSM to decrypt each of the master key shard ciphertexts using the private key of the HSM to recover master key shards of the set. The operator may then repeat these steps for the second master key escrow recovery device and the second set of master key shard ciphertexts as well as the third master escrow recovery device and the third set of master key shard ciphertexts. As a result, the computing device may hold, at different times, a first set of recovered master key shards that includes a first shard of a first master key, a first shard of a second master key, and a third shard of a third master key, a second set of recovered master key shards that includes a second shard of the first master key, a second shard of the second master key, and a third shard of the third master key, and a third set of recovered master key shards that includes a third shard of the first master key, a third shard of the second master key, and a third shard of the third master key.

In various embodiments, the first party may purchase or otherwise acquire three groups of HSMs to be used to transfer the three sets of recovered master key shards from the computing device. Each group of HSMs, for example, may include two HSMs and may correspond to one set of recovered master key shards. For each group of HSMs, a public private key pair may be generated.

In various embodiments, a public key of each group of HSMs may be utilized to encrypt a number of the recovered master key shards. For example, a public key of the first group of HSMs may be utilized to encrypt each of the recovered master key shards of the first master key (as opposed to the first shard of each master key). Similarly, a public key of the second group of HSMs may be utilized to encrypt each of the recovered master key shards of the second master key and a public key of the third group of HSMs may be utilized to encrypt each of the recovered master key shards of the third master key. Each of the encryptions may be performed by the operator of the computing device using a corresponding HSM.

In various embodiments, the encrypted recovered master key shards may be transferred off the computing device and delivered to the first party. The first party may then utilize a private key of each group of HSMs to decrypt corresponding encrypted recovered master key shards. For example, the first party may utilize a private key of the first group of HSMs to decrypt the encrypted recovered master key shards of the first master key. Similarly, the first party may utilize a private key of the second group of HSMs to decrypt the encrypted recovered master key shards of the second master key and a private key of the third group of HSMs to decrypt the encrypted recovered master key shards of the third master key. The recovered master key shards may than be utilized to regenerate the three master keys. After the first party verifies the regenerated master keys, the physically isolated computer device may be destroyed.

Embodiments disclosed herein may be implemented on a computing system as disclosed, for example, in U.S. patent application Ser. No. 16/359,055 filed Mar. 20, 2019, the disclosure of which is incorporated by reference in its entirety.

Notably, embodiments of an authoritative blockchain as disclosed herein may operate on and within a secure computing environment. In contrast to a conventional environment in which policies may be enforced only through, for example, human-enforced rules and procedures, this secure computing environment may implement policies as previously disclosed using restraints enforced by computing hardware that cannot be changed by human operators without using the appropriate computer-enforced mechanism, such as policy modifications as described above. In a secure computing environment as disclosed herein, the business logic that accepts new transactions for entry on the blockchain (whether valid and/or approved) may be implemented within a secure computing boundary, such as on one or more HSMs. Typically, the executable code stored in and executed by the HSM is protected from the introduction of unaudited through the use of a quorum that may include multiple auditors. Each HSM may accept new business logic embodied in new or modified executable code only if it is properly signed with the correct digital signature or signatures. In some embodiments, new code may be signed only after a successful code audit. For example, the policy may require a proposed modification to be signed by a registered code auditor. Such restrictions may be enforced by the HSM hardware itself, further reducing the possibility of tampering. Multiple HSMs may be used for additional security and/or redundancy. For example, multiple HSMs may implement a consensus network or similar algorithm to decide the next transaction that should be included in the authoritative blockchain.

HSMs as disclosed herein may be obtained by and/or operated by "validator" operators as previously disclosed, which may be entities that have been vetted by one or more owners or other controlling entities of the blockchain system to be reliable and independent counterparties. However, the use of multiple HSMs may provide protection and security against failure, error, or fraud related to one or more HSMs as disclosed herein. Validator entities maintain the HSMs and make them available to the authoritative blockchain system. As previously disclosed, validators cannot control, access, or modify the software running on the HSMs because each HSM will only execute software that has been securely audited and cryptographically approved, which requires appropriate authorization according to policies of the authoritative blockchain as previously disclosed. Notably, validator operators of the HSMs do not have access to secrets stored on the HSMs and even in the case where one or more operators or HSMs are compromised or fails, as long as a quorum of operators and HSMs are available then all secrets are securely preserved as previously disclosed.

In addition to using HSMs, embodiments disclosed herein may structure the policies in the system such that data operated on by the HSMs cannot be examined by operators of the HSMs or developers of the audited code implemented on the HSMs other than allowed by the policies. This is a consequence of implementing the control policies within the HSM- and policy-controlled system as previously disclosed, where the policies themselves are subject to the same controls as any other transaction in the system.

In some embodiments, cryptographic secrets may be created, stored, and imported in the secure boundary of an authoritative blockchain system as disclosed herein. To create a secret, a random number may be generated within an HSM of the system. The random number may itself be the secret, or it may be used to generate, encrypt, or otherwise create a secret using any suitable cryptographic techniques. In some cases, a secret may be created jointly by multiple HSMs, for example using multi-party computation (MPC) techniques and sharded so that no single HSM within the group stores the entire secret. Continuing the previous examples, where multiple HSMs are used to implement an authoritative blockchain, some or all of the blockchain HSMs may be used to generate such a secret. Such arrangements may provide additional security and/or redundancy for the secret. If one or more shards are lost, the secret may still be regenerated if a sufficient number of remaining shards are available. Similarly, if one or more shards are compromised, the secret may still be protected as long as not enough shards are compromised to reconstruct the secret. Each HSM may store the associated portion of the secret in a blockchain transaction, which may be signed by a private key of the HSM. This may provide a secure form of backup for the secret. Access to the secret may be guarded not only by the sharding and encryption of the secret but also by other policy restrictions on the blockchain itself.

Notably, regardless of whether the secret is sharded or a single secret, the secret will not be known or otherwise available to any person, computing system, or other entity in unencrypted form outside the HSM(s), but still may be used within the authoritative blockchain according to the policies implemented in the blockchain. For example, a set of policies may allow the secret to be used to create a digital asset address and/or sign a transaction related to the address upon receipt of transactions showing approval of a quorum of predefined entities that are authorized by the policies to use the secret. In response, the HSM(s) may automatically decrypt the secret (or shards of the secret) and use it to sign the indicated transaction without revealing the secret outside the secure computing environment of the HSM(s). As previously indicated, because the system is controlled by policies that are implemented in the authoritative blockchain system, no operators, developers, hosting facility or other host entities, administrators, or other individual entities may control use and security of the secret, other than as specified by the policies. Further, as previously disclosed, the policies may only be modified via transactions submitted to the blockchain and thus cannot be arbitrarily changed to allow access by an entity that otherwise would not have access.

FIG. 1A shows a block diagram illustrating a sample relationship of various elements according to some embodiments of the disclosed subject matter. As shown, HSM group 1 110 may include HSM H_11 182*a* and HSM H_12 182*b*, HSM group 2 112 may include HSM H_21 184*a* and HSM H_22 184*b*, and HSM group 3 114 may include HSM H_31 186*a* and HSM H_32 186*b*. The various shards of master key M1 120 may be stored on HSM group 1 110, the various shards of master key M2 122 may be stored on HSM group 2 112, and the various shards of master key M3 124 may be stored on HSM group 3 114. As also shown, the third party escrow firm L1 132 may hold or otherwise be responsible for HSM Y11 142*a* and HSM Y12 142*b*, the third party escrow firm L2 134 may hold or otherwise be responsible for HSM Y21 144*a* and HSM Y22 144*b*, and the third party escrow firm L3 136 may hold or otherwise be responsible for HSM Y31 146*a* and HSM Y32 146*b*.

In various embodiments, as shown in FIG. 1, each of HSMs Y11 142*a* and Y12 142*b* may be utilized to encrypt a first shard of master key M1 120, a first shard of master key M2 122, and a first shard of master key M3 124. Similarly, each of HSMs Y21 144*a* and Y22 144*b* may be utilized to encrypt a second shard of master key M1 120, a second shard of master key M2 122, and a second shard of master key M3 124 and each of HSMs Y31 146*a* and Y32 146*b* may be utilized to encrypt a third shard of master key M1 120, a third shard of master key M2 122, and a third shard of master key M3 124. Although not shown in FIG. 1, the various ciphertexts generated by encrypting the various shards may be stored in two additional HSMs and/or on two write once read many (WORM) storage devices.

Figure 2:
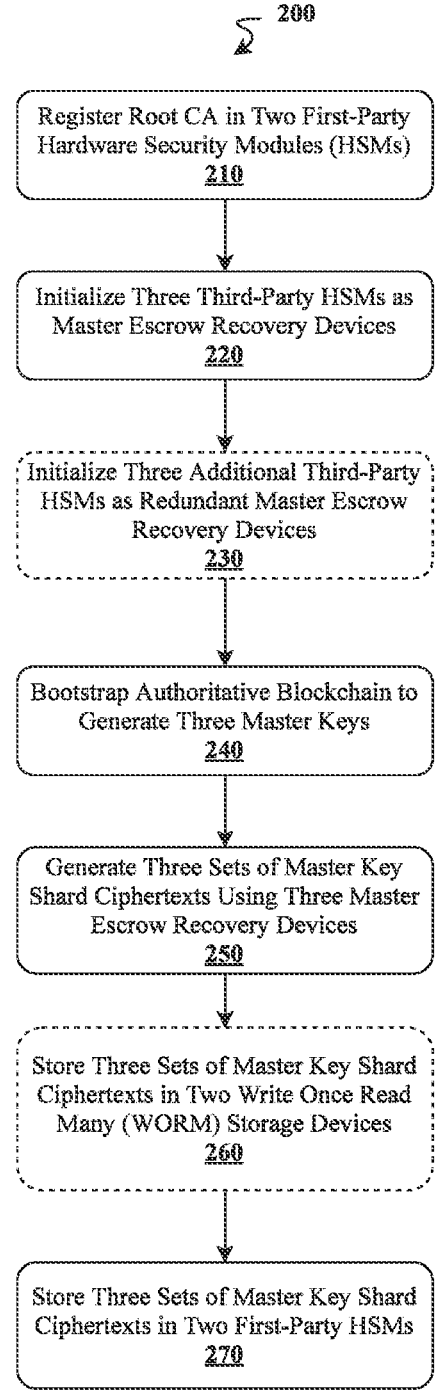
FIG. 2 shows a flow chart of a method for escrow of master keys according to embodiments of the disclosed subject matter.

FIG. 2 shows a method 200 for escrow of master keys according to various implementations of the disclosed subject matter. In various implementations, the steps of method 200 may be performed by a processor of a device, such as a hardware security module (HSM) or other computing device. Although the method shows steps in a particular order, this is only for simplicity.

In step 210, a root certificate authority (CA) may be registered in two first-party hardware security modules (HSMs) of a first party. The first party may be, for example, an operator of an authoritative blockchain. The root CA may belong, for example, to another party otherwise uninvolved in the escrow process. For example, the root CA may belong to Yubico of Palo Alto, Calif.

In step 220, three third-party HSMs may be initialized as master escrow recovery devices. These HSMs are referred to as third-party HSMs because they correspond to third parties different from the first party. In various embodiments, each third-party HSM may belong to or otherwise correspond to a different third party. The initialization process may be described in greater detail below in relation to FIG. 3.

In optional step 230, three additional third-party HSMs may be initialized as redundant master escrow recovery devices. That is, for each master escrow recovery device, a redundant master escrow recovery device may also be created. In various embodiments, each pair of master escrow recovery device and redundant master escrow recovery device corresponds to a different one of the third parties.

In step 240, the first party may perform a bootstrap operation on an authoritative blockchain to generate three master keys. In various embodiments, the three master keys may be utilized to encrypt or otherwise secure various digital assets to be associated with the authoritative blockchain.

In step 250, three sets of master key shard ciphertexts may be generated using three master escrow recovery devices. For example, each master key may be sharded into three shards, a first master escrow recovery device may be used to generate a first set of master key shard ciphertexts based on a first shard of each master key, a second master escrow recovery device may be used to generate a second set of master key shard ciphertexts based on a second shard of each master key, and a third master escrow recovery device may be used to generate a third set of master key shard ciphertexts based on a third shard of each master key. The generation of each set of master key shard ciphertexts may be described in greater detail below in relation to FIG. 4.

In optional step 260, the three sets of master key shard ciphertexts may be stored on two write one read many (WORM) storage devices. For example, the various ciphertexts may be stored on a first worm storage device and the various ciphertexts may also be stored on a second worm storage device in redundant fashion. Of note, while master escrow recovery devices corresponding to third parties are utilized to generate the various ciphertexts, the various ciphertexts are stored on storage of the first party.

In step 270, the three sets of master key shard ciphertexts may be stored on two first-party HSMs of the first party.

Figure 3:
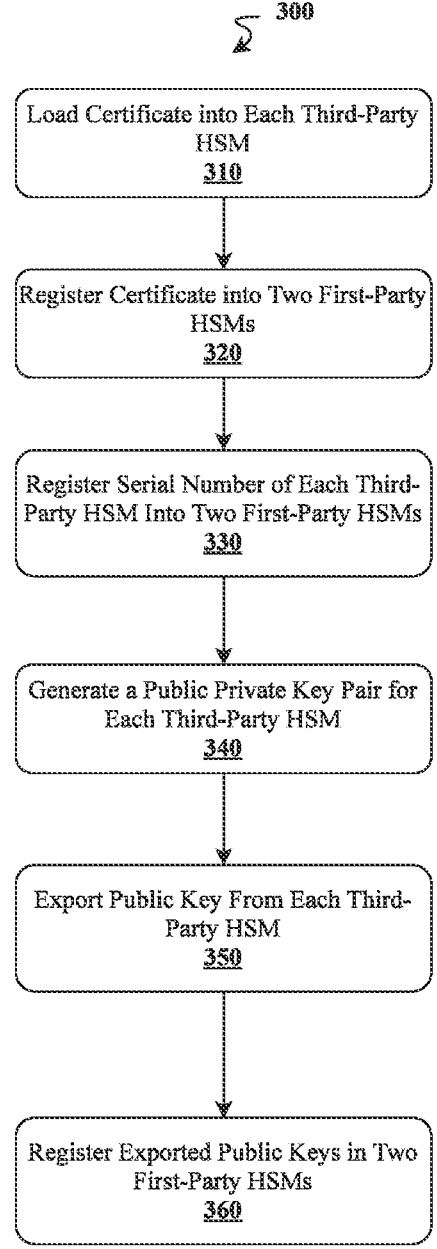
FIG. 3 shows a flow chart of a method for initializing a master escrow recovery device according to an embodiment of the disclosed subject matter.

FIG. 3 shows a method 300 for initializing a HSM as a master escrow recovery device according to various implementations of the disclosed subject matter. In various implementations, the steps of method 300 may be performed by a processor of a device, such as a hardware security module (HSM) or other computing device. Although the method shows steps in a particular order, this is only for simplicity.

In step 310, a certificate may be loaded into each of a number of third-party HSMs. For example, the certificate may be loaded into each of three third-party HSMs. The certificate may include, for example, a public key signed by an intermediate CA related to the root CA loaded into two first-party HSMs, such as the root CA loaded into the two first-party HSMs of step 210 of the method 200 of FIG. 2.

In various embodiments, such intermediate certificate may enable a trace of the root of trust for the third-party HSMs.

In step 320, the intermediate certificate may be registered into two first-party HSMs. For example, the intermediate certificate may be registered into the two first-party HSMs of step 210 of the method 200 of FIG. 2.

In step 330, a serial number of each third-party HSM may be registered into two first-party HSMs, such as the two first-party HSMs of step 320. As a result of steps 320 and 330, each of the two first-party HSMs contain the serial numbers of all of the third-party HSMs and the intermediate certificate.

In step 340, a public private key pair may be generated for each third-party HSM. For example, a first third-party HSM may be utilized to generate a first public private key pair on the first third-party HSM, a second third-party HSM may be utilized to generate a second public private key pair on the second third-party HSM, and a third third-party HSM may be utilized to generate a third public private key pair on the third third-party HSM.

In step 350, a public key may be exported from each of the third-party HSM. For example, a public key portion of the first public private key pair may be exported from the first third-party HSM, a public key portion of the second public private key pair may be exported from the second third-party HSM, and a public key portion of the third public private key pair may be exported from the third third-party HSM.

In step 360, the exported public keys may be registered in two first-party HSMs. For example, the three public keys may be registered in the two first-key HSMs that were also utilized in steps 320 and 330 above. In this way, each of the two first-key HSMs may include the intermediate certificate as well as the various serial numbers and public keys of all of the third-party HSMs. As such, the two first-party HSMs may be utilized to validate and/or otherwise verify the third-party HSMs during any subsequent recovery process.

Figure 4:
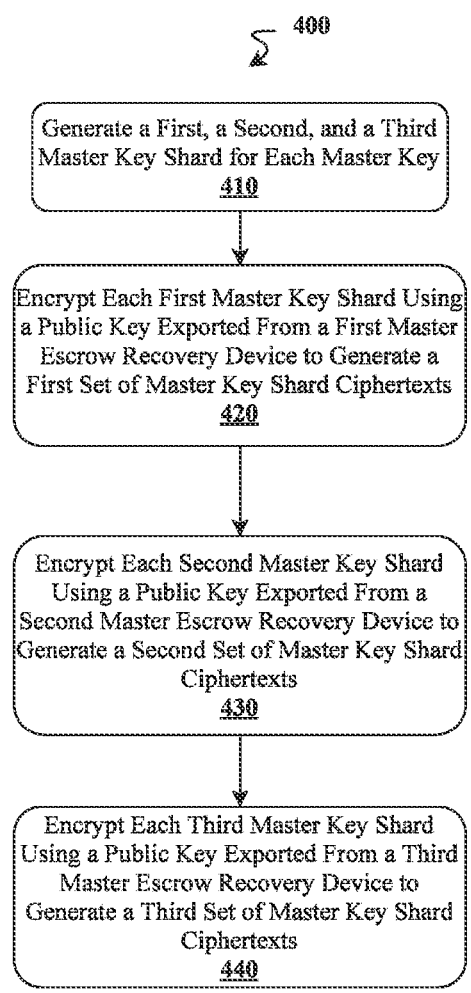
FIG. 4 shows a flow chart of a method for generating master key shard ciphertexts according to an embodiment of the disclosed subject matter.

FIG. 4 shows a method 400 for generating sets of master key shard ciphertexts according to various implementations of the disclosed subject matter. In various implementations, the steps of method 400 may be performed by a processor of a device, such as a hardware security module (HSM) or other computing device. Although the method shows steps in a particular order, this is only for simplicity.

In step 410, a first, a second, and a third master key shard may be generated for each master key. For example, in the case of three master keys, a first master key may be sharded three times to generate three shards, a second master key may be sharded three times to generate three shards, and a third master key may be sharded three times to generate three shards. In this example, there would be three first shards (i.e., a first shard of master key one, a first shard of master key two, and a first shard of master key three), three second shards (i.e., a second shard of master key one, a second shard of master key two, and a second shard of master key three), and three third shards (i.e., a third shard of master key one, a third shard of master key two, and a third shard of master key three).

In step 420, each first master key shard may be encrypted using a public key exported from a first master escrow recovery device to generate a first set of master key shard ciphertexts. For example, a master escrow recovery device (i.e., a third-party HSM) associated with a first third party may be utilized to generate a set of master key shard ciphertexts corresponding to the three first shards of the three master keys.

In step 430, each second master key shard may be encrypted using a public key exported from a second master escrow recovery device to generate a second set of master key shard ciphertexts. For example, a master escrow recovery device (i.e., a third-party HSM) associated with a second third party may be utilized to generate a set of master key shard ciphertexts corresponding to the three second shards of the three master keys.

In step 440, each third master key shard may be encrypted using a public key exported from a third master escrow recovery device (i.e., a third-party HSM) associated with a third third party may be utilized to generate a set of master key shard ciphertexts corresponding to the three third shards of the three master keys.

Of note, as a result of the method 400, each third party may be responsible for a master escrow recovery device that corresponds not to a master key, but rather a set of shards of all of the master keys. For example, a master escrow recovery device associated with a first third party corresponds to a set including the first shard of each of the master keys. Similarly, a master escrow recovery device associated with a second third party corresponds to a set including the second shard of each of the master keys and a master escrow recovery device associated with a third third party corresponds to a set including the third shard of each of the master keys.

Figure 5:
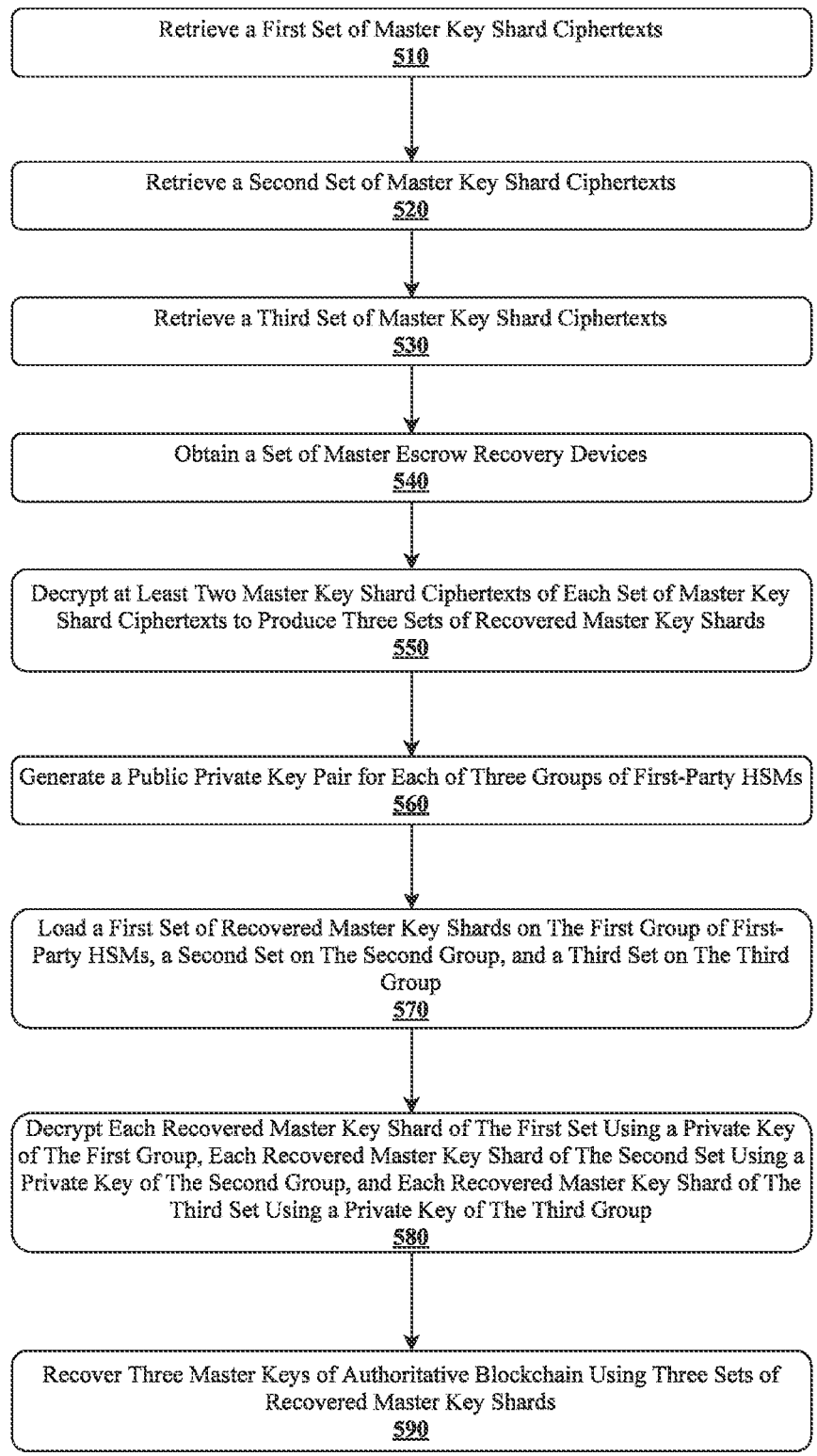
FIG. 5 shows a flow chart of a method for recovery of master keys from escrow according to embodiments of the disclosed subject matter.

FIG. 5 shows a method 500 for recovery of previously escrowed master keys according to various implementations of the disclosed subject matter. In various implementations, the steps of method 500 may be performed by a processor of a device, such as a hardware security module (HSM) or other computing device. Although the method shows steps in a particular order, this is only for simplicity.

In step 510, a first set of master key shard ciphertexts may be retrieved. In various embodiments, the first set of master key shard ciphertexts may have been previously generated by a master key escrow process, such as the method 200 of FIG. 2. The first set of master key shard ciphertexts may correspond to a set of first master key shards. For example, the first set of master key shard ciphertexts may have been generated based on a set of master key shards including a first shard of a first master key, a first shard of a second master key, and a first shard of a third master key. The first set of master key shard ciphertexts may be retrieved, for example, from two first-party HSMs and/or two worm storage devices of a first party.

In step 520, a second set of master key shard ciphertexts may be retrieved. In various embodiments, the second set of master key shard ciphertexts may have been previously generated by a master key escrow process, such as the method 200 of FIG. 2. The second set of master key shard ciphertexts may correspond to a set of second master key shards. For example, the second set of master key shard ciphertexts may have been generated based on a set of master key shards including a second shard of the first master key, a second shard of the second master key, and a third shard of the third master key. The second set of master key shard ciphertexts may be retrieved, for example, from two first-party HSMs and/or two worm storage devices of a first party.

In step 530, a third set of master key shard ciphertexts may be retrieved. In various embodiments, the third set of master key shard ciphertexts may have been previously generated by a master key escrow process, such as the method 200 of FIG. 2. The third set of master key shard ciphertexts may correspond to a set of third master key shards. For example, the third set of master key shard ciphertexts may have been generated based on a set of master key shards including a third shard of the first master key, a third shard of the second master key, and a third shard of the third master key. The third set of master key shard ciphertexts may be retrieved, for example, from two first-party HSMs and/or two worm storage devices of a first party.

In step 540, a set of master escrow recovery devices may be obtained. For example, a master escrow recovery device may be obtained from each of a number of third parties. In various embodiments, the master escrow recovery devices were previously generated and provided to each of the third parties as part of a master key escrow process, such as the method 200 of FIG. 2. In one example, a total of three master escrow devices may have been generated and provided to each of three third parties. However, the set of master escrow recovery devices may not necessarily include all of the previously generated and provided master escrow recovery devices. For example, the obtained set may only include two of the three master escrow recovery devices associated with third parties. Regardless of the total number of master escrow recovery devices associated with third parties, the set of master escrow recovery devices obtained may include a sufficient number of devices to recover the master keys of an authoritative blockchain.

In step 550, at least two master key shard ciphertexts of each set of master key shard ciphertexts may be decrypted to produce three sets of recovered master key shards. As discussed above, each set of master key shard ciphertexts may include, for example, a master key shard ciphertext of each master key (e.g., set one includes ciphertexts based on first shards, set two includes ciphertexts based on second shards, and set three includes ciphertexts based on third shards). However, each set of recovered master key shards may include, for example, recovered master key shards of a single master key (e.g., set one includes shards of master key one, set two includes shards of master key two, and set three includes shards of master key three). As such, each set of recovered master key shards may include a sufficient number of shards to recovery a master key. In the case of three master keys each with three shards, two shards of each master key may be sufficient to recover each master key. By decrypting as least two master key shard ciphertexts, each set of recovered master key shards may include at least two recovered master key shards.

In step 560, a public private key pair may be generated for each of three groups of first-party HSMs. In various embodiments, each group may include two HSMs. Each group of first-party HSMs may correspond, for example, to a set of recovered master key shards.

In step 570, a first set of recovered master key shards may be loaded on the first group of first-party HSMs, a second set of recovered master key shards may be loaded on the second group of first-party HSMs, and a third set of recovered master key shards may be loaded on the third group of first-party HSMs. As disclosed in further detail below related to FIG. 6, each set of recovered master key shards may be loaded onto a group of first-party HSMs in such a way that the various recovered master key shards are not exposed or otherwise able to be acquired by anyone other than the first party.

In step 580, each recovered master key shard of the first set may be decrypted using a private key of the first group of first-party HSMs, each recovered master key shard of the second set may be decrypted using a private key of the second group of first-party HSMs, and each recovered master key shard of the third set may be decrypted using a private key of the third group of first-party HSMs. In various embodiments, the unencrypted recovered master key shards may only be available on or otherwise within the group of first-party HSMs used to decrypt the shards.

In step 590, the three master keys of the authoritative blockchain may be recovered using the three sets of recovered master key shards. For example, the first set of recovered master key shards may be utilized to recover or otherwise regenerate the first master key. Similarly, the second set of recovered master key shards may be utilized to recover or otherwise regenerate the second master key and the third set of recovered master key shards may be utilized to recover or otherwise regenerate the third master key.

Figure 6:
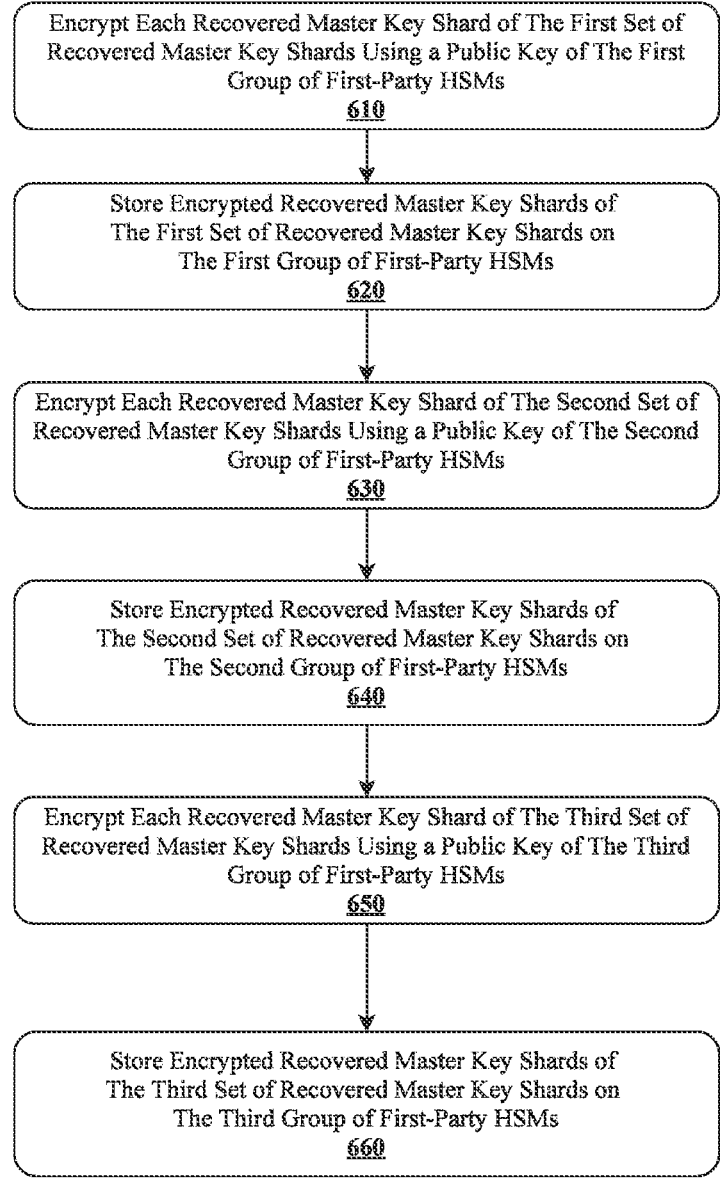
FIG. 6 shows a flow chart of a method for loading sets of recovered master key shards onto groups of hardware security modules according to embodiments of the disclosed subject matter.

FIG. 6 shows a method 600 for loading sets of recovered master key shards onto groups of first-party HSMs according to various implementations of the disclosed subject matter. In various implementations, the steps of method 600 may be performed by a processor of a device, such as a hardware security module (HSM) or other computing device. Although the method shows steps in a particular order, this is only for simplicity.

In step 610, each recovered master key shard of the first set of recovered master key shards may be encrypted using a public key of the first group of first-party HSMs. In various embodiments, each of the recovered master key shards of the first set may be stored or otherwise maintained on a number of master escrow recovery devices (i.e., third-party HSMs). For example, a first recovered master key shard of the first set may reside on a first master escrow recovery device, a second recovered master key shard of the first set may reside on a second master escrow recovery device, and a third recovered master key shard of the first set may reside on a third master escrow recovery device. As such, the first master escrow recovery device may be utilized to encrypt the first recovered master key shard, the second master escrow recovery device may be utilized to encrypt the second recovered master key shard, and the third master escrow recovery device may be utilized to encrypt the third recovered master key shard. In some embodiments, a physically isolated computing device, such as a laptop, may be utilized to facilitate this step.

In step 620, the encrypted recovered master key shards of the first set may be stored on the first group of first-party HSMs. For example, the physically isolated computing device may be utilized to transfer the encrypted shards to the first group of first-party HSMs.

In step 630, each recovered master key shard of the second set of recovered master key shards may be encrypted using a public key of the second group of first-party HSMs. In various embodiments, each of the recovered master key shards of the second set may be stored or otherwise maintained on a number of master escrow recovery devices (i.e., third-party HSMs). For example, a first recovered master key shard of the second set may reside on a first master escrow recovery device, a second recovered master key shard of the second set may reside on a second master escrow recovery device, and a third recovered master key shard of the second set may reside on a third master escrow recovery device. As such, the first master escrow recovery device may be utilized to encrypt the first recovered master key shard, the second master escrow recovery device may be utilized to encrypt the second recovered master key shard, and the third master escrow recovery device may be utilized to encrypt the third recovered master key shard. In some embodiments, a physically isolated computing device, such as a laptop, may be utilized to facilitate this step.

In step 640, the encrypted recovered master key shards of the second set may be stored on the second group of first-party HSMs. For example, the physically isolated computing device may be utilized to transfer the encrypted shards to the second group of first-party HSMs.

In step 650, each recovered master key shard of the third set of recovered master key shards may be encrypted using a public key of the third group of first-party HSMs. In various embodiments, each of the recovered master key shards of the third set may be stored or otherwise maintained on a number of master escrow recovery devices (i.e., third-party HSMs). For example, a first recovered master key shard of the third set may reside on a first master escrow recovery device, a second recovered master key shard of the third set may reside on a second master escrow recovery device, and a third recovered master key shard of the third set may reside on a third master escrow recovery device. As such, the first master escrow recovery device may be utilized to encrypt the first recovered master key shard, the second master escrow recovery device may be utilized to encrypt the second recovered master key shard, and the third master escrow recovery device may be utilized to encrypt the third recovered master key shard. In some embodiments, a physically isolated computing device, such as a laptop, may be utilized to facilitate this step.

In step 660, the encrypted recovered master key shards of the third set may be stored on the third group of first-party HSMs. For example, the physically isolated computing device may be utilized to transfer the encrypted shards to the third group of first-party HSMs.

As described above, methods, computer readable media, and devices for escrow of master keys of an authoritative blockchain have been disclosed. In addition, as described above, methods, computer readable media, and devices for recovery of previously escrowed master keys have been disclosed.

Figure 7:
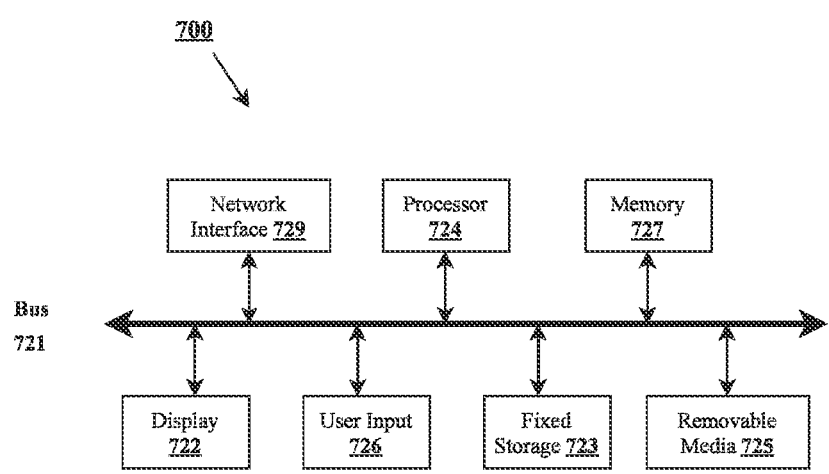
FIG. 7 shows a computing device according to an embodiment of the disclosed subject matter.

Embodiments of the presently disclosed subject matter may be implemented in and used with a variety of component and network architectures. FIG. 7 is an example computing device 700 suitable for implementing embodiments of the presently disclosed subject matter. The device 700 may be, for example, a desktop or laptop computer, a mobile computing device such as a phone, tablet, or the like, or a display as disclosed herein. The device 700 may include a bus 721 which interconnects major components of the computer 700, such as a central processor 724, a memory 727 such as Random Access Memory (RAM), Read Only Memory (ROM), flash RAM, or the like, a user display 722 such as a display screen, a user input interface 726, which may include one or more controllers and associated user input devices such as a keyboard, mouse, touch screen, and the like, a fixed storage 723 such as a hard drive, flash storage, and the like, a removable media component 725 operative to control and receive an optical disk, flash drive, and the like, and a network interface 729 operable to communicate with one or more remote devices via a suitable network connection.

The bus 721 allows data communication between the central processor 724 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 720 are generally stored on and accessed via a computer readable medium, such as a hard disk drive (e.g., fixed storage 723), an optical drive, floppy disk, or other storage medium.

The fixed storage 723 may be integral with the device 700 or may be separate and accessed through other interfaces. The network interface 729 may provide a direct connection to a remote server via a wired or wireless connection. The network interface 729 may provide such connection using any suitable technique and protocol as will be readily understood by one of skill in the art, including digital cellular telephone, WiFi, Bluetooth®, near-field, and the like. For example, the network interface 729 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 727, fixed storage 723, removable media 725, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method for escrow of master keys, the method comprising:
    initializing each of three third-party hardware security modules (HSMs) as master escrow recovery devices, wherein:
        each third-party HSM corresponds to a different third party;
        the different third parties are different from a single first party; and
        the different third parties and the single first party all peer review the master escrow recovery device initialization;
    performing a bootstrap operation on an authoritative blockchain to generate three master keys;
    generating a first set of master key shard ciphertexts using a first one of the three master escrow recovery devices, a second set of master key shard ciphertexts using a second one of the three master escrow recovery devices, and a third set of master key shard ciphertexts using a third one of the three master escrow recovery devices;
    storing the first set of master key shard ciphertexts, the second set of master key shard ciphertexts, and the third set of master key shard ciphertexts as opaque objects in each of two first-party HSMs, the two first-party HSMs corresponding to the single first party; and
    initializing each of three additional third-party HSMs as redundant master escrow recovery devices, each redundant master escrow recovery device corresponding to one master escrow recovery device.

2. The method of claim 1, further comprising:
    initializing at least one additional third-party HSMs as an additional master escrow recovery device, each additional third-party HSM corresponding to a different third party;
    generating at least one additional set of master key shard ciphertexts using the at least one additional master escrow recovery device;
    storing the at least one additional set of master key shard ciphertexts in the at least two different write once read many (WORM) storage; and
    storing the at least one additional set of master key shard ciphertexts as opaque objects in each of the two first-party HSMs.

3. The method of claim 1, wherein the different third parties and the single first party all peer review the master escrow recovery device initialization.

4. The method of claim 1, further comprising:
    storing the first set of master key shard ciphertexts, the second set of master key shard ciphertexts, and the third set of master key shard ciphertexts in at least two different write once read many (WORM) storage devices.

5. A computer-implemented method for escrow of master keys, the method comprising:
    initializing each of three third-party hardware security modules (HSMs) as master escrow recovery devices, wherein:
        each third-party HSM corresponds to a different third party;
        the different third parties are different from a single first party; and
        the different third parties and the single first party all peer review the master escrow recovery device initialization;
    performing a bootstrap operation on an authoritative blockchain to generate three master keys;
    generating a first set of master key shard ciphertexts using a first one of the three master escrow recovery devices, a second set of master key shard ciphertexts using a second one of the three master escrow recovery devices, and a third set of master key shard ciphertexts using a third one of the three master escrow recovery devices; and
    storing the first set of master key shard ciphertexts, the second set of master key shard ciphertexts, and the third set of master key shard ciphertexts as opaque objects in each of two first-party HSMs, the two first-party HSMs corresponding to the single first party;
    wherein initializing each of the three third-party HSMs as master escrow recovery devices comprises:
        loading a certificate into each of the third-party HSM, the certificate comprising a public key signed by an intermediate CA corresponding to the root CA;
        registering the certificate into each of the two first-party HSMs; and
    for each of the three third-party HSMs:
        registering a serial number of the corresponding third-party HSM into each of the two first-party HSMs;
        generating a public private key pair of the corresponding third-party HSM, an attestation certificate of the public private key pair being verified by the first party without export capability;
        exporting the public key portion from the corresponding third-party HSM; and
        registering the exported public key portion into each of the two first-party HSMs.

6. A computer-implemented method for escrow of master keys, the method comprising:
    initializing each of three third-party hardware security modules (HSMs) as master escrow recovery devices, wherein:
        each third-party HSM corresponds to a different third party;
        the different third parties are different from a single first party; and
        the different third parties and the single first party all peer review the master escrow recovery device initialization;
    performing a bootstrap operation on an authoritative blockchain to generate three master keys;
    generating a first set of master key shard ciphertexts using a first one of the three master escrow recovery devices, a second set of master key shard ciphertexts using a second one of the three master escrow recovery devices, and a third set of master key shard ciphertexts using a third one of the three master escrow recovery devices; and storing the first set of master key shard ciphertexts, the second set of master key shard ciphertexts, and the third set of master key shard ciphertexts as opaque objects in each of two first-party HSMs, the two first-party HSMs corresponding to the single first party;

wherein generating a first set of master key shard ciphertexts using the first master escrow recovery device, a second set of master key shard ciphertexts using the second master escrow recovery device, and a third set of master key shard ciphertexts using the third master escrow recovery devices comprises:

generating, for each of the three master keys, a first master key shard, a second master key shard, and a third master key shard;

encrypting each of the first master key shards using a first public key exported from the first master escrow recovery device to generate the first set of master key shard ciphertexts;

encrypting each of the second master key shards using a second public key exported from the second master escrow recovery device to generate the second set of master key shard ciphertexts; and encrypting each of the third master key shards using a third public key exported from the third master escrow recovery device to generate the third set of master key shard ciphertexts, wherein the first, second, and third public keys are registered in each of the two first-party HSMs.

7. A computer-implemented method for recovery of master keys from escrow, the method comprising:

retrieving a first set of master key shard ciphertexts from a prior escrow generated using a first master escrow recovery device associated with a first of three different third parties, wherein the first set of master key shard ciphertexts comprises a first master key shard ciphertext of a first master key of an authoritative blockchain of a first party, a first master key shard of a second master key of the authoritative blockchain, and a first master key shard of a third master key of the authoritative blockchain;

retrieving a second set of master key shard ciphertexts from the prior escrow generated using a second master escrow recovery device associated with a second of the three different third parties, wherein the second set of master key shard ciphertexts comprises a second master key shard ciphertext of the first master key, a second master key shard of the second master key, and a second master key shard of the third master key;

retrieving a third set of master key shard ciphertexts from the prior escrow generated using a third master escrow revery device associated with a third of the three different third parties, wherein the third set of master key shard ciphertexts comprises a third master key shard ciphertext of the first master key, a third master key shard of the second master key, and a third master key shard of the third master key;

wherein the first party is different from each of the three different third parties;

obtaining a set of master escrow recovery devices, wherein:

each master escrow recovery device comprises a third-party hardware security module (HSM);

each third-party HSM was previously initialized as a master escrow recovery device by registering information corresponding to each third-party HSM in a first-party HSM of the first party; and the set of master escrow recovery devices includes at least two of the first, the second, and the third master escrow recovery devices;

decrypting, using the set of master escrow recovery devices, at least two master key shard ciphertexts of each set of master key shard ciphertexts to produce three sets of recovered master key shards;

generating, for each of three groups of first-party HSMs, a public private key pair;

loading a first set of recovered master key shards on the first group of first-party HSMs, a second set of recovered master key shards on the second group of first-party HSMs, and a third set of recovered master key shards on the third group of first-party HSMs;

decrypting, using a corresponding private key of the corresponding group of first-party HSMs, each recovered master key shard of the three sets of recovered master key shards; and recovering, using the three sets of recovered master key shards, three master keys of the authoritative blockchain of the first party.

8. The method of claim 7, wherein:

the first set of master key shard ciphertexts was previously generated by:

encrypting the first master key shard of the first master key using a first public key exported from the first master escrow recovery device;

encrypting the first master key shard of the second master key using a second public key exported from the second master escrow recovery device; and encrypting the first master key shard of the third master key using a third public key exported from the third master escrow recovery device;

the second set of master key shard ciphertexts was previously generated by:

encrypting the second master key shard of the first master key using the first public key exported from the first master escrow recovery device;

encrypting the second master key shard of the second master key using the second public key exported from the second master escrow recovery device; and encrypting the second master key shard of the third master key using the third public key exported from the third master escrow recovery device; and the third set of master key shard ciphertexts was previously generated by:

encrypting the third master key shard of the first master key using the first public key exported from the first master escrow recovery device;

encrypting the third master key shard of the second master key using the second public key exported from the second master escrow recovery device; and encrypting a third master key shard of the third master key using the third public key exported from the third master escrow recovery devices.

9. The method of claim 7, wherein:

the first set of recovered master key shards corresponds to the first master key;

the second set of recovered master key shards corresponds to the second master key; and the third set of recovered master key shards corresponds to the third master key.

10. The method of claim 7, wherein:

each group of first-party HSMs comprises two first-party HSMs; and the first-party HSMs correspond to the first party.

11. The method of claim 7, wherein loading a first set of recovered master key shards on the first group of first-party HSMs, a second set of recovered master key shards on the second group of first-party HSMs, and a third set of recovered master key shards on the third group of first-party HSMs comprises:

for the first set of recovered master key shards:
encrypting, using the first group of first-party HSMs, each recovered master key shard of the first set of recovered master key shards using a public key of the public private key pair of the first group of first-party HSMs; and
storing the encrypted recovered master key shards of the first set of recovered master kay shards on the first group of first-party HSMs;

for the second set of recovered master key shards:
encrypting, using the second group of first-party HSMs, each recovered master key shard of the second set of recovered master key shards using a public key of the public private key pair of the second group of first-party HSMs; and
storing the encrypted recovered master key shards of the second set of master kay shards on the second group of first-party HSMs; and for the third set of recovered master key shards:
encrypting, using the third group of first-party HSMs, each recovered master key shard of the third set of recovered master key shards using a public key of the public private key pair of the third group of first-party HSMs; and
storing the encrypted recovered master key shards of the third set of master key shards on the third group of first-party HSMs.

12. The method of claim 7, further comprising:
retrieving at least one additional set of master key shard ciphertexts, each additional set of master key shard ciphertexts comprising an additional master key shard ciphertext of the first master key, an additional master key shard of the second master key, and an additional master key shard of the third master key and each additional set of master key shard ciphertexts previously escrowed using an additional master escrow recovery device,
wherein the set of master escrow recovery devices includes at least three of the first, the second, the third, and the at least one additional master escrow recovery devices.

13. The method of claim 7, wherein decrypting at least two master key shard ciphertexts of each set of master key shard ciphertexts to produce three sets of master key shards comprises using a physically isolated computing device.

14. A computer-implemented method comprising:
escrowing three master keys of an authoritative blockchain of a first party with three different third parties, wherein the escrowing is peer reviewed by the first party and the three different third parties; and
recovering the three master keys from escrow, wherein the recovering involves the first party and at least two of the three different third parties and the recovering is peer reviewed by the first party and the at least two of the three different third parties;
wherein recovering the three master keys from escrow comprises:
retrieving three sets of master key shard ciphertexts corresponding to the three master keys of the authoritative blockchain of the first party, wherein:
the first set of master key shard ciphertexts comprises a first master key shard ciphertext of the first master key, a first master key shard of the second master key, and a first master key shard of the third master key, the first set of master key shard ciphertexts previously escrowed using a first master escrow recovery device;
the second set of master key shard ciphertexts comprises a second master key shard ciphertext of the first master key, a second master key shard of the second master key, and a second master key shard of the third master key, the second set of master key shard ciphertexts previously escrowed using a second master escrow recovery device;
the third set of master key shard ciphertexts comprises a third master key shard ciphertext of the first master key, a third master key shard of the second master key, and a third master key shard of the third master key, the third set of master key shard ciphertexts previously escrowed using a third master escrow recovery device;
each master escrow recovery device corresponds to a different one of the three third parties; and
the first party is different from each of the three third parties;
obtaining a set of master escrow recovery devices, wherein:
each master escrow recovery device comprises a third-party hardware security module (HSM);
each third-party HSM was previously initialized as a master escrow recovery device by registering information corresponding to each third-party HSM in a first-party HSM of the first party; and
the set of master escrow recovery devices includes at least two of the first, the second, and the third master escrow recovery devices;
decrypting, using the set of master escrow recovery devices, at least two master key shard ciphertexts of each set of master key shard ciphertexts to produce three sets of master key shards;
generating, for each of three groups of first-party HSMs, a public private key pair;
loading a first set of recovered master key shards on the first group of first-party HSMs, a second set of recovered master key shards on the second group of first-party HSMs, and a third set of recovered master key shards on the third group of first-party HSMs;
decrypting, using a corresponding private key of the corresponding group of first-party HSMs, each master key shard of the three sets of recovered master key shards; and
recovering, using the three sets of recovered master key shards, three master keys of the authoritative blockchain of the first party.

15. The method of claim 14, wherein escrowing three master keys of an authoritative blockchain of a first party with three different third parties comprises:
initializing each of three third-party hardware security modules (HSMs) as master escrow recovery devices, wherein:
each third-party HSM corresponds to a different one of the three different third parties;
the different third parties are different from the single first party; and
the different third parties and the single first party all peer review the master escrow recovery device initialization;

performing a bootstrap operation on the authoritative blockchain to generate the three master keys;

generating a first set of master key shard ciphertexts using a first one of the three master escrow recovery devices, a second set of master key shard ciphertexts using a second one of the three master escrow recovery devices, and a third set of master key shard ciphertexts using a third one of the three master escrow recovery devices; and storing the first set of master key shard ciphertexts, the second set of master key shard ciphertexts, and the third set of master key shard ciphertexts as opaque objects in each of two first-party HSMs, the two first-party HSMs corresponding to the first party.

* * * * *